(12) United States Patent
Rioja Calvo

(10) Patent No.: US 8,925,695 B2
(45) Date of Patent: Jan. 6, 2015

(54) PROGRESSIVE DAMPING DEVICE FOR FURNITURE

(76) Inventor: Miguel Angel Rioja Calvo, Zarautz (ES)

( * ) Notice: Subject to any disclaimer, the term of this patent is extended or adjusted under 35 U.S.C. 154(b) by 381 days.

(21) Appl. No.: 13/052,695

(22) Filed: Mar. 21, 2011

(65) Prior Publication Data

US 2011/0233015 A1 Sep. 29, 2011

(30) Foreign Application Priority Data

Mar. 24, 2010 (ES) .................................. 201030430

(51) Int. Cl.
*F16F 9/34* (2006.01)
*F16F 9/516* (2006.01)
*F16F 9/512* (2006.01)

(52) U.S. Cl.
CPC ............. *F16F 9/3415* (2013.01); *F16F 9/5126* (2013.01)
USPC ..................... 188/282.5; 188/280; 188/282.1; 188/313; 188/316; 188/322.15

(58) Field of Classification Search
USPC ........ 188/280, 281, 282.1, 282.3, 282.5, 284, 188/313, 316, 317, 322.13, 322.15; 16/49, 16/51, 58
See application file for complete search history.

(56) References Cited

U.S. PATENT DOCUMENTS

| 1,282,712 A | * | 10/1918 | Barrell | 188/280 |
| 2,310,570 A | * | 2/1943 | Briggs | 188/280 |
| 3,991,659 A | * | 11/1976 | Robinson | 188/280 |
| 4,356,898 A | * | 11/1982 | Guzder et al. | 188/280 |

FOREIGN PATENT DOCUMENTS

| EP | 1563763 A1 | * | 8/2005 |
| JP | 55126140 A | * | 9/1980 |
| JP | 05164174 A | * | 6/1993 |

* cited by examiner

*Primary Examiner* — Thomas J Williams
(74) *Attorney, Agent, or Firm* — Egbert Law Offices, PLLC

(57) ABSTRACT

A progressive damping device for furniture is designed to prevent impacts between the mobile parts of furniture provided with self-closing systems, and provides progressive closure according to the speed and energy acquired in the closure. The damping device generally includes a cylinder in which a dynamic fluid circulates, and in the interior of which there is displaced a piston which has a rod provided with an elastoplastic valve, which delimits respective compression and expansion chambers.

3 Claims, 4 Drawing Sheets

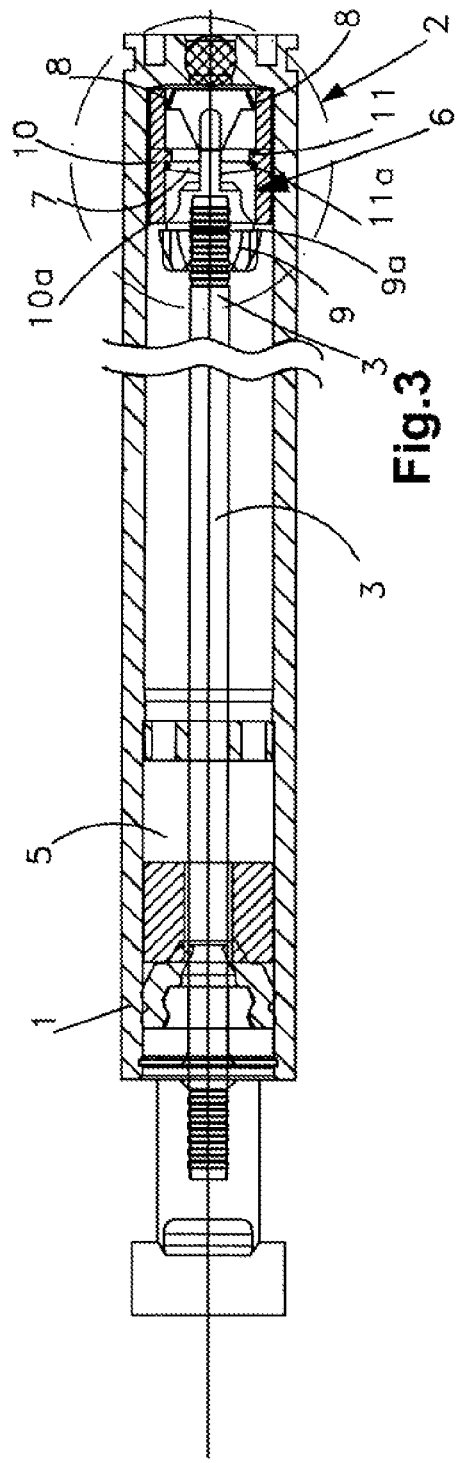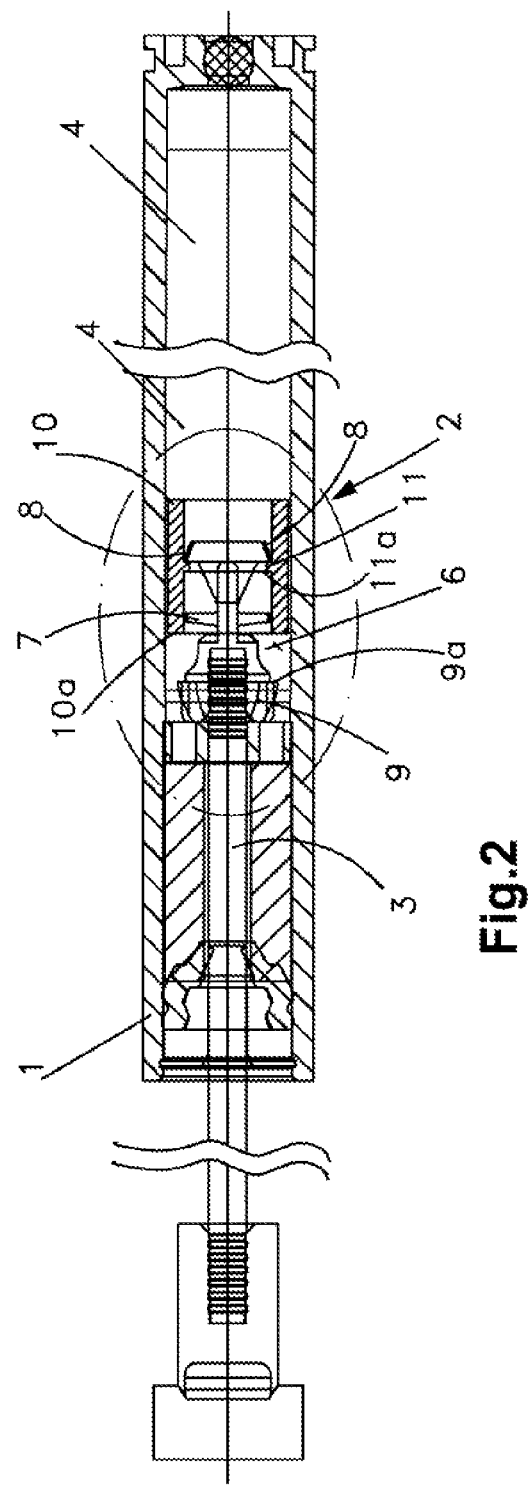

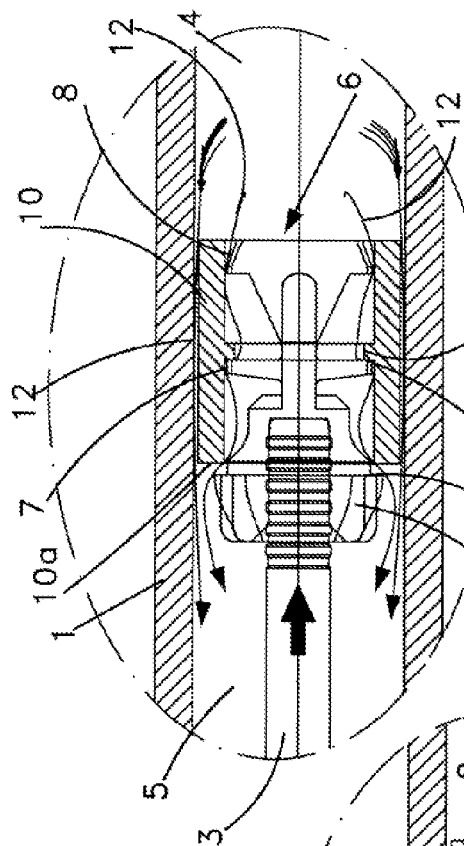
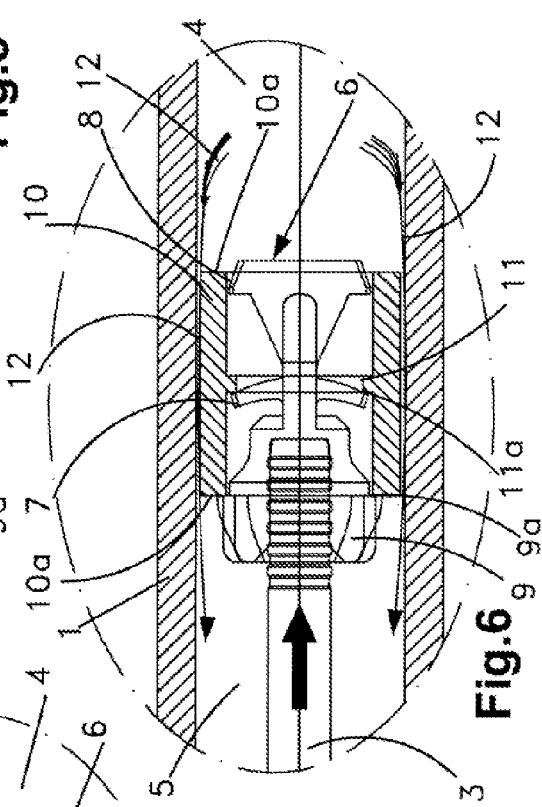
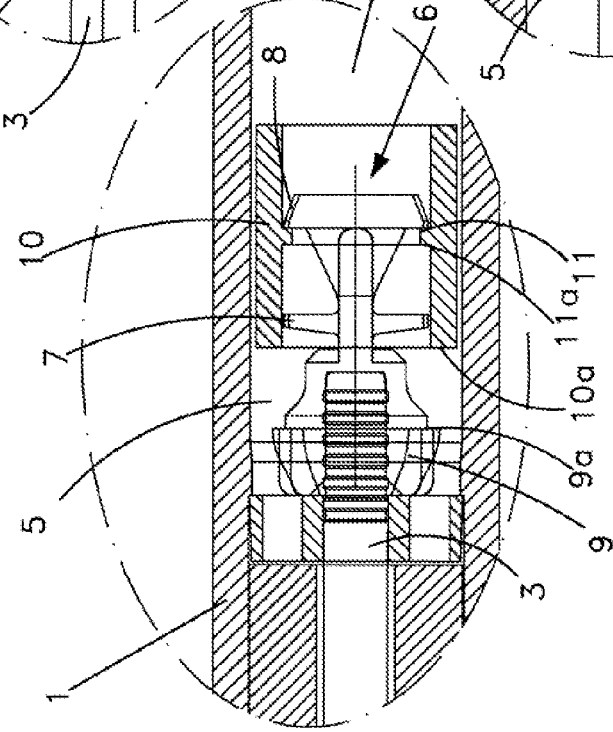

PROGRESSIVE DAMPING DEVICE FOR FURNITURE

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to a progressive damping device for furniture, which is designed to prevent impacts between the mobile parts of furniture provided with self-closing systems, and provides progressive closure according to the speed and energy acquired in the closure, whilst complying with a general composition comprising a cylinder in which a dynamic fluid circulates, and in the interior of which there is displaced a piston which has a rod provided with an elastoplastic valve, which delimits respective compression and expansion chambers.

2. Description of Related Art Including Information Disclosed Under 37 CFR 1.97 and 37 CFR 1.98

In this field there are known devices provided with dampers for furniture with a self-closing system, for the purpose of preventing impact between the mobile part of the furniture, such as a drawer, and the fixed part. Amongst these devices, reference can be made to Spanish patent P-200400369 "Damping device for furniture" by the same inventor, which describes a damper based on a fluid-dynamic cylinder in which the cylindrical body is provided with a piston which is displaced in relation to the cylindrical body. The said piston has a cylindrical form and is modified by two faces which are opposite one another, and the dimensions of which decrease to form a coaxial extension. However, this damping mechanism does not provide progressive damping based on speed.

In order to prevent problems of impact of the furniture during closure by obtaining progressive damping, a number of devices have been developed, most of which are highly complex, thus adding to their production costs and making assembly difficult. In order to solve this problem, the same applicant submitted the additional Spanish patent P-200500139, in which graduation of the damping action was achieved according to the speed of the impulse to be damped. For this purpose, this damping device comprises an inner cylindrical sleeve which is prolonged by means of a strip of an elastoplastic nature, and extends diametrically in the form of a bridge which projects beyond the point of the extension of the piston in the form of a basket. This basket will permit graduation in the damping of the closure of the furniture by means of its resilient flexure, but the part which is provided with the basket is produced by injection, and the point of injection coincides with the strip of the basket. This means that it is difficult to predict the exact modulus of flexure, including the origin of possible points of occurrence of rupture cracks.

These problems are exacerbated by the dimensions of the parts with a greatly reduced size. In addition, this basket forms together with the extension of the piston an end in the form of a crosspiece, which is interposed in the fluid discharge flow.

BRIEF SUMMARY OF THE INVENTION

In view of this situation, the present invention proposes a device for damping progressively according to speed, which comprises a cylinder body in which a dynamic fluid circulates, and the interior of which comprises a piston with a rod which extends from the cylinder body, and delimits two chambers, one for compression in the damping, and the other for expansion, which, depending on the position of the piston, have a variable volume.

The piston is a cylindrical sleeve which contains in its interior a displaceable elastoplastic valve, which is provided with symmetrical resilient fins with a total radial dimension which is greater than the inner diameter of the interior annular projection of the cylindrical sleeve. The longitudinal position of these resilient fins when not flexed being such that their distance to the wall which closes the head of the elastoplastic valve is greater than the distance between the active side of the interior annular projection and the seating wall of the cylindrical sleeve, with these resilient fins reaching the active side of the interior annular projection before the wall which closes the head of the elastoplastic valve abuts the seating wall of the cylindrical sleeve.

The resilient fins of the elastoplastic valve are equidistant, there are preferably two of them, and their radial length is larger than the smaller inner diameter of the interior annular projection of the cylindrical sleeve, including in the state of flexure of the resilient fins.

The cylindrical sleeve has its interior annular projection with its respective sides equidistant from the seating walls of the cylindrical sleeve, thus facilitating its reversible assembly.

The point of support of the resilient fins on the interior annular projection of the cylindrical sleeve will be derived from the impact provided in the movement in the direction of damping, on the active side of the annular projection.

As far as the functioning is concerned, account must be taken of the fact that this is a device for damping progressively according to the speed and the force of the impact. Consequently, when there is a normal closure speed or a normal impact, the resilient fins are supported on the active side of the interior annular projection, without being flexed, and the closure wall of the head of the elastoplastic valve remains at a minimum distance from the seating wall of the cylindrical sleeve. In this case, the dynamic fluid will flow both through the cylindrical sleeve and the elastoplastic valve, and via the exterior of this cylindrical sleeve.

In the case when the impact force is high, there is a high impact, or the closure force is greater, the resilient fins will be supported on the active side of the annular projection, and will be flexed to a greater or lesser extent, depending on the energy which they absorb in the impact, by this means achieving progressive damping. The closure wall of the head of the elastoplastic valve is supported completely on the seating wall of the cylindrical sleeve, such that the passage of the dynamic fluid in the interior of the cylindrical sleeve is closed.

When the fluid absorbs to a large extent the energy of the initial impact, the resilient fins will abandon their flexed position, since the system is balanced. In this position, the head of the elastoplastic valve will be situated in the low-impact position, and there will once more be a minimum distance between the closure wall and the seating wall of the cylindrical sleeve, thus permitting the passage of the fluid through the cylindrical sleeve and the elastoplastic valve, as well as on the exterior of this cylindrical sleeve.

This device must be able to be re-armed for further use, and so on. Consequently it must be ensured that the re-arming process can be undertaken with a lesser effort, i.e. the flow of fluid transferred between the expansion and compression chambers in the re-arming phase must be greater than in the braking phase.

The cylindrical sleeve, for its part, is symmetrical in relation to its two axes, which results in greater ease of assembly and production. Each wall of the cylindrical sleeve will have a different function, depending on the position in which the assembly is carried out.

With reference to the configuration of the elastoplastic valve, in its production there will be no breakage points in the injection process, since this injection need not be carried out at any specific geometric point, and no critical dimensions arise. This facilitates the production process and subsequent assembly, since the part is symmetrical relative to its longitudinal axis.

BRIEF DESCRIPTION OF THE SEVERAL VIEWS OF THE DRAWINGS

In order to understand better the nature of the invention, the attached drawings represent an industrial embodiment, purely by way of illustrative and non-limiting example.

FIG. 2 is a schematic view of the damping device in the position corresponding to the beginning of the path of the piston (2), indicating the corresponding detail of the elastoplastic valve (6) and the cylindrical sleeve (10) in this position.

FIG. 3 is a schematic view of the damping device in the position corresponding to the end of the path of the piston (2).

FIG. 4 is an enlargement of the detail shown in FIG. 2, and is a view in cross-section of the damping device at the beginning of the path.

FIG. 5 is a schematic view of the damping device when a low impact occurs during the closure.

FIG. 6 is a schematic view of the damping device when a high impact occurs during the closure.

Figure 1:
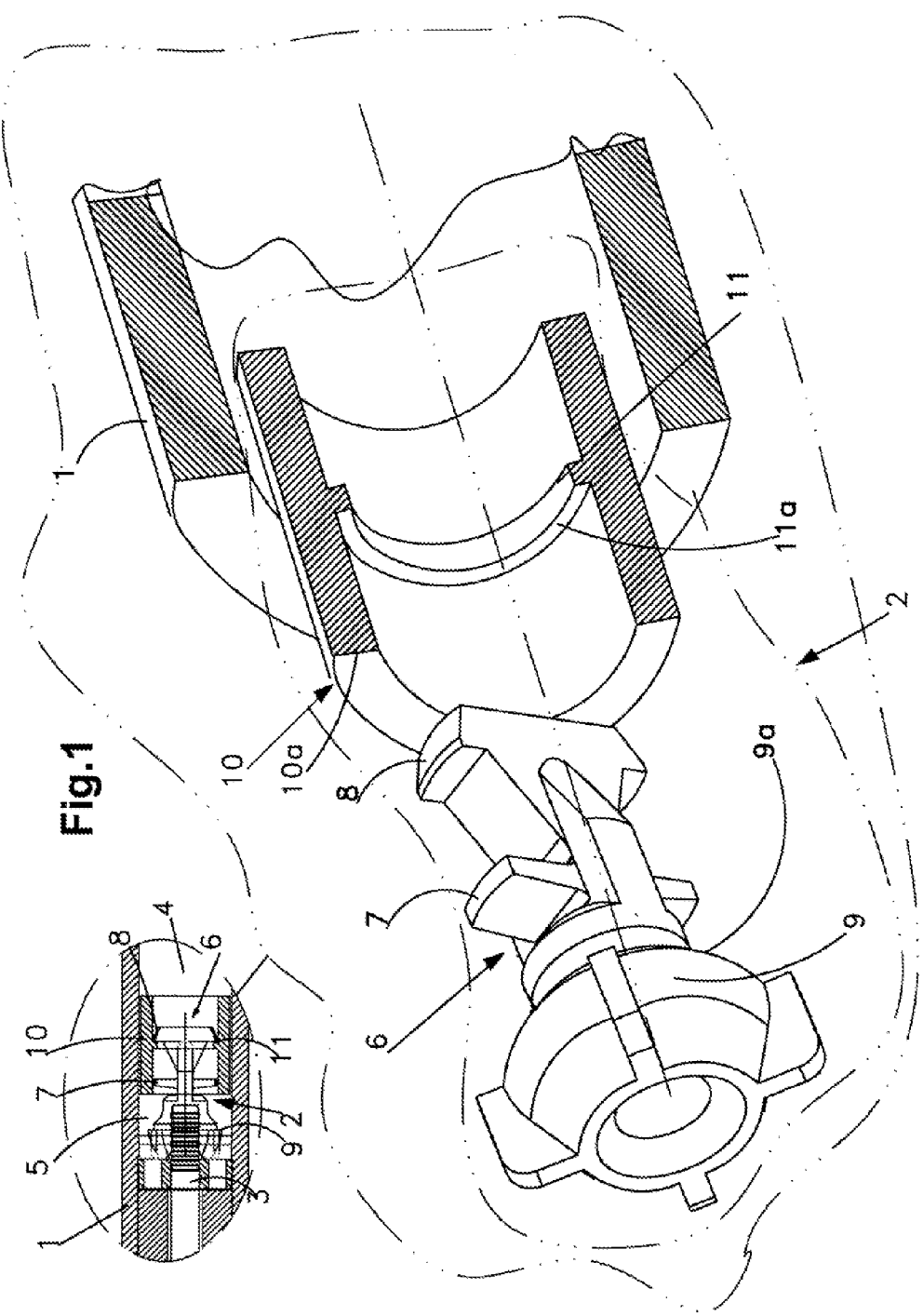
FIG. 1 is a cross-section of the damping device at the beginning of the path, showing in perspective an enlarged detail of the elastoplastic valve (6), the cylindrical sleeve (10) and the cylinder body (1) in dismantled form.
Figure 8:
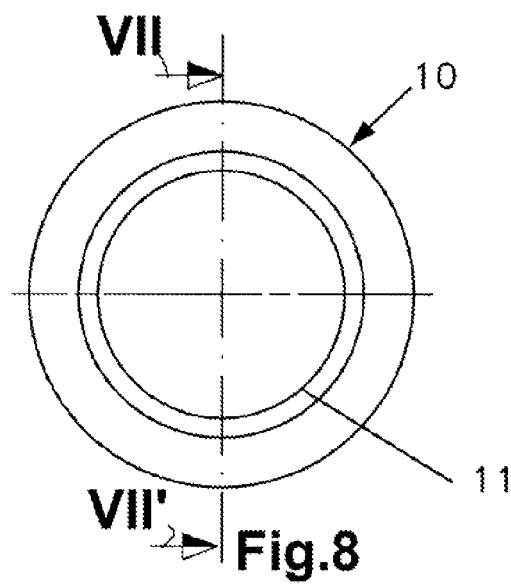
FIG. 8 shows the profile of the cylindrical sleeve (10).
Figure 7:
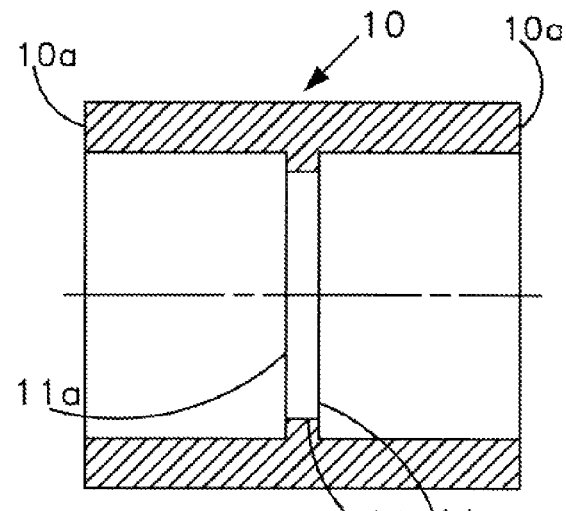
FIG. 7 shows the cross-section indicated in FIG. 8, according to line VII-VII' of the cylindrical sleeve (10).
Figure 10:
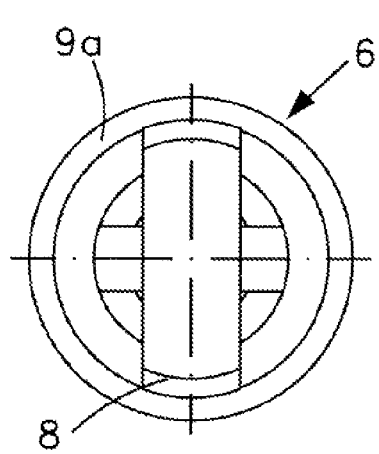
FIG. 10 is the profile view of the elastoplastic valve (6).
Figure 9:
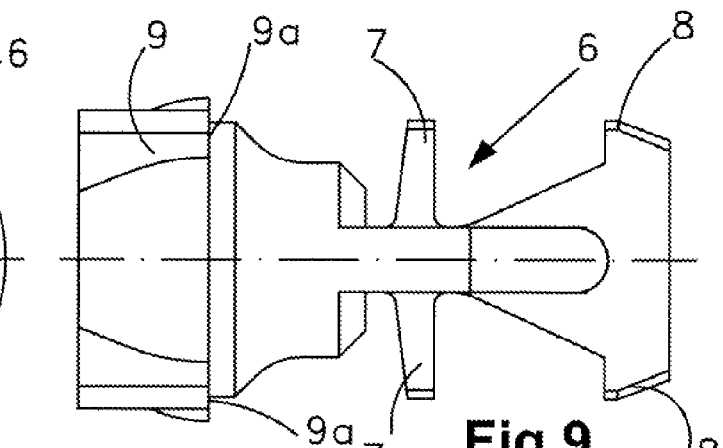
FIG. 9 is the front view of the elastoplastic valve (6).
Figure 11:
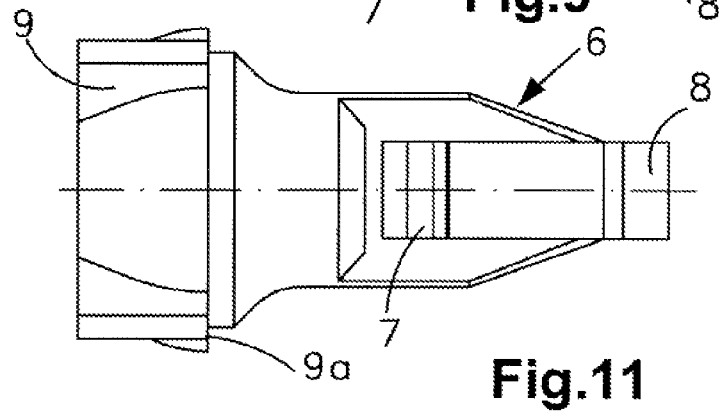
FIG. 11 is the plan view of the elastoplastic valve (6).

In these figures, the following alphanumerical references are given:

1—Cylinder body
2—Piston
3—Piston rod (2)
4—Chamber for compression in damping
5—Expansion chamber
6—Elastoplastic valve of the piston (2)
7—Resilient fins of the elastoplastic valve (6)
8—Stops of the elastoplastic valve (6)
9—Elastoplastic valve head (6)
9a—Wall which closes the head (9)
10—Cylindrical sleeve of the piston (2)
10a—Cylindrical sleeve wall (10)
11—Interior annular projection of the cylindrical sleeve (10)
11a—Interior annular projection side (11)
12—Fluid transfer lines.

DETAILED DESCRIPTION OF THE INVENTION

With reference to the aforementioned references and drawings, the appended plans illustrate a preferred embodiment of the subject of the invention, with reference to a progressive damping device for furniture which, as illustrated in FIG. 1, comprises a cylinder body (1) through which a dynamic fluid circulates, and the interior of which comprises a piston (2) which has a rod (3) which extends outside the cylinder body (1), and delimits two chambers, for compression during damping (4), and for expansion (5), and which have a variable volume, depending on the position of the piston (2) (FIGS. 2 and 3).

As illustrated in FIG. 1, the piston (2) is a cylindrical sleeve (10) which contains in its interior a displaceable elastoplastic valve (6) which is provided with symmetrical resilient fins (7) with a total radial dimension which is greater than the inner diameter of the interior annular projection (11) of the cylindrical sleeve (10), the longitudinal position of these resilient fins (7) when not flexed being such that their distance to the wall (9a) which closes the head (9) of the elastoplastic valve (6) is greater than the distance between the active side (11a) of the interior annular projection (11) and the seating wall (10a) of the cylindrical sleeve (10), with these resilient fins (7) reaching the active side (11a) of the interior annular projection (11) before the wall (9a) which closes the head (9) of the elastoplastic valve (6) abuts the seating wall (10a) of the cylindrical sleeve (10).

The resilient fins (7) of the elastoplastic valve (6) are equidistant, there are preferably two of them, and their radial length is larger than the smaller inner diameter of the interior annular projection (11) of the cylindrical sleeve (10), including in the state of flexure of the resilient fins (7). The dimensions of the length and thickness of these resilient fins (7) can be determined accurately, and different numbers and forms of the fins can be combined, since it is possible to opt for embodiments with three or four resilient fins (7), with thicknesses and lengths which differ from one another.

The cylindrical sleeve (10) has its interior annular projection (11) with its respective active sides (11a) equidistant from the respective seating wall (10a), thus facilitating its reversible assembly.

The point of support of the resilient fins (6) on the interior annular projection (11) of the cylindrical sleeve (10) will be derived from the impact provided in the movement in the direction of damping, on the active side (11a) of the interior annular projection (11).

As far as the functioning is concerned, account must be taken of the fact that this is a device for damping progressively according to the speed and the force of the impact.

As can be seen in FIG. 5, when there is a normal closure speed or a normal impact, the resilient fins (7) are supported on the active side (11a) of the interior annular projection (11), without being flexed, and the closure wall (9a) of the head of the elastoplastic valve (6) remains at a minimum distance from the seating wall (10a) of the cylindrical sleeve (10). In this case, the dynamic fluid will flow both through the cylindrical sleeve (10) and the elastoplastic valve (6), and via the exterior of this cylindrical sleeve (10).

In the case when the impact force is high, there is a high impact, or the closure force is greater, as illustrated in FIG. 6, the resilient fins (6) will be supported on the active side (11*a*) of the annular projection (11), and will be flexed to a greater or lesser extent, depending on the energy which they absorb in the impact, by this means achieving progressive damping. The closure wall (9*a*) of the head of the elastoplastic valve (6) is supported completely on the seating wall (10*a*) of the cylindrical sleeve (10), such that the passage of the dynamic fluid in the interior of the cylindrical sleeve (10) is closed.

When the fluid absorbs to a large extent the energy of the initial impact, the resilient fins will abandon their flexed position, since the system is balanced. In this position, the head (9) of the elastoplastic valve (6) will be situated in the low-impact position, and there will once more be a minimum distance between the closure wall (9*a*) and the seating wall (10*a*) of the cylindrical sleeve (10), thus permitting the passage of the fluid through the cylindrical sleeve (10) and the elastoplastic valve (6), as well as on the exterior of this cylindrical sleeve (10).

This device must be able to be re-armed for further use, and so on. Consequently it must be ensured that the re-arming process can be undertaken with a lesser effort, i.e. the cross-section of passage of the flow of fluid transferred between the expansion and compression chambers in the re-arming phase must be greater than in the braking phase.

As illustrated in FIG. 4, the stops (8) of the elastoplastic valve (6) are supported on the interior annular projection (11) in the re-arming phase, so that the cylindrical sleeve (10) moves together with the elastoplastic valve (6).

The cylindrical sleeve, for its part, is symmetrical in relation to its two axes, which results in greater ease of assembly and production. In other words, each wall of the cylindrical sleeve will have a different function, depending on the position in which the assembly is carried out.

With reference to the configuration of the elastoplastic valve (6), in its production there will be no breakage points in the injection process, since this injection need not be carried out at any specific geometric point, and no critical dimensions arise. This facilitates the production process and subsequent assembly, since the part is symmetrical relative to its longitudinal axis.

I claim:

1. A progressive damping device for furniture, the progressive damping device comprising:
   a cylindrical body through which a dynamic fluid circulates, said cylindrical body havinu an interior; and
   a piston disposed in said interior of said cylindrical body, said piston having a rod extending therefrom and outwardly of said cylindrical body, said piston defining a pair of chambers in said cylindrical body, said pair of chambers for compression during damping and for expansion, said pair of chambers each having a variable volume relative to a position of said piston, said piston having a cylindrical, sleeve which contains a displaceable valve having symmetrical resilient fins with a total radial dimension that is greater than an inner diameter of an interior annular projection of said cylindrical sleeve, a longitudinal position of said symmetrical resilient fins when not flexed is such that a distance of said symmetrical resilient tins to a wall which closes a head of said elastoplastic valve is greater than a distance between an active side of said interior annular projection and a seating wall of said cylindrical sleeve, said symmetrical resilient fins reaching said active side of said interior annular projection before said wall that closes said head of said elastoplastic valve abuts said seating wall of said cylindrical sleeve.

2. The progressive damping device of claim 1, said symmetrical resilient fins being equidistant from each other, said symmetrical resilient fins having a radial length that is larger than an inner diameter of said interior annular projection of said cylindrical sleeve.

3. The progressive damping device of claim 1, said cylindrical sleeve having respective sides of said interior annular projection equidistant from respective seating wall of said cylindrical sleeve.

\* \* \* \* \*